United States Patent
Gao et al.

(10) Patent No.: US 12,310,328 B2
(45) Date of Patent: May 27, 2025

(54) PLANT-BASED CAT LITTER AND PREPARATION METHOD THEREOF

(71) Applicant: Qingdao Magic Pet Products Co., Ltd., Qingdao (CN)

(72) Inventors: Panjin Gao, Qingdao (CN); Juanjuan Gou, Qingdao (CN); Luning Jin, Qingdao (CN); Yi Liu, Qingdao (CN)

(73) Assignee: Qingdao Magic Pet Products Co., Ltd., Qingdao (CN)

( * ) Notice: Subject to any disclaimer, the term of this patent is extended or adjusted under 35 U.S.C. 154(b) by 55 days.

(21) Appl. No.: 18/345,480

(22) Filed: Jun. 30, 2023

(65) Prior Publication Data
US 2024/0334898 A1    Oct. 10, 2024

(30) Foreign Application Priority Data
Apr. 10, 2023 (CN) .......................... 202310373486.2

(51) Int. Cl.
*A01K 1/015*    (2006.01)

(52) U.S. Cl.
CPC .................................. *A01K 1/0155* (2013.01)

(58) Field of Classification Search
CPC ...... A01K 1/0155; A01K 1/0152; Y02P 60/87
See application file for complete search history.

(56) References Cited

U.S. PATENT DOCUMENTS

2013/0213314 A1* 8/2013 Wang ...................... B29C 44/54
264/41

* cited by examiner

*Primary Examiner* — Anthony J Zimmer
*Assistant Examiner* — Joshua Maxwell Speer
(74) *Attorney, Agent, or Firm* — Thomas|Horstemeyer, LLP

(57) ABSTRACT

The present disclosure provides a plant-based cat litter and a preparation method thereof, and relates to the technical field of pet products. In the present disclosure, the plant-based cat litter is prepared by coconut shell fiber, coffee grounds, starch, a binder, and water. The plant-based cat litter adopts purely natural, pollution-free, safe, and non-toxic raw materials, is easy to clean, has desirable adsorption and deodorization effects, and cannot be moldy after long-term storage. The plant-based cat litter is easy to use, is not easy to be broken and fractured during storage and transportation, and shows excellent coating properties on feces. Therefore, the plant-based cat litter can effectively improve a living environment of cats.

16 Claims, No Drawings

PLANT-BASED CAT LITTER AND PREPARATION METHOD THEREOF

This patent application claims the benefit and priority of Chinese Patent Application No. 2023103734862, filed with the China National Intellectual Property Administration on Apr. 10, 2023, the disclosure of which is incorporated by reference herein in its entirety as part of the present application.

TECHNICAL FIELD

The present disclosure relates to the technical field of pet products, in particular to a plant-based cat litter and a preparation method thereof.

BACKGROUND

Cat litter is a material that owners use to bury feces and urine for their cats. The cat litter has desirable water absorption, and is generally used together with a cat litter box (also known as a cat toilet). The early cat litter was mainly non-clumping cat litter, which was mainly used for feces storage. However, this type of cat litter does not clump and cannot play a storage role when encountering urine, such that the cat litter needs to be checked frequently and scooped out in time during use. Therefore, this type of cat litter is very inconvenient to use, needs to be replaced frequently, and has relatively high consumption, thus easily causing waste. Accordingly, clumping cat litter products have appeared on the market. The clumping cat litter can form a ball after absorbing urine and feces, and it is convenient to clean up the ball with a cat litter shovel. Compared with non-clumping cat litter, this type of product is more convenient and economical to use. Therefore, the clumping cat litter is more favored by consumers than non-clumping cat litter.

At present, the commercially available clumping cat litter mainly includes the following types: bentonite-based clumping cat litter, tofu cat litter, and sawdust cat litter. The bentonite-based clumping cat litter uses bentonite as a main component, and can form a ball when coming into contact with urine or feces. This kind of cat litter is lighter and has a better foot feel, such that it is suitable for those cats like to bury by nature, and is also easier to clean up. However, this type of cat litter has small particles and is easy to get stuck between the cat's toes. Cats may lick off the small grains of litter left between their toes after defecating, posing a health hazard for pets. In addition, the bentonite-based cat litter is dusty and cannot be degraded, showing unfriendly to the environment. The tofu cat litter is prepared by the residues of tofu as a raw material. This kind of cat litter has desirable clumping properties, easy cleaning, environmental-friendliness, as well as degradability, less dust, and no toxicity. However, this type of cat litter also has a high cost, a beany smell, poor wrapping of feces, and low insect resistance in summer or humid environment. Moreover, this cat litter is easily broken and fractured during storage and transportation, resulting in poor performances during use. The sawdust cat litter is prepared by conducting granulation on reclaimed pine or Chinese fir sawdust as raw materials with a small amount of natural binders. This type of product has extremely less dust, and shows desirable clumping and deodorization functions. However, sawdust is susceptible to moisture and fleas. Some cats don't like the smell of wood, are uncomfortable with the touch, and even refuse to use the cat litter. This product has a much higher price than that of the bentonite-based cat litter. Sawdust powders are easily carried out of the basin and pollute the home.

Therefore, it is a focus of current research to develop a type of environmental-protection plant-based cat litter. This plant-based cat litter has no dust, light weight, low difficulty in breaking and fracturing, desirable wrapping, excellent smell, and high adsorption.

SUMMARY

The present disclosure is intended to solve the above problems, and then overcome the defects of existing clumping cat litter products with high dust content, easy breakage and fracture, and poor wrapping, and undesirable smell. The present disclosure provides an environment-friendly plant-based cat litter by adjusting types and proportions of raw materials and combining with a specific preparation process. The plant-based cat litter has no dust, light weight, low difficulty in breaking and fracturing, desirable wrapping, excellent smell, and high adsorption.

The present disclosure provides a plant-based cat litter, including the following raw materials in parts by weight: 35 parts to 50 parts of a coconut shell fiber, 5 parts to 20 parts of coffee grounds, 25 parts to 45 parts of starch, 1 part to 10 parts of a binder, and 8 parts to 16 parts of water.

Further, the plant-based cat litter includes the following raw materials in parts by weight: 40 parts to 48 parts of the coconut shell fiber, 10 parts to 16 parts of the coffee grounds, 30 parts to 40 parts of the starch, 1 part to 6 parts of the binder, and 10 parts to 15 parts of water.

Further, a preparation method of the coconut shell fiber includes: separating a coconut shell from a kernel of a mature coconut; allowing the coconut shell to stand for 25 d to 35 d to conduct ripening; subjecting an obtained ripened coconut shell to pulverization and then sieving through a 30-mesh sieve to obtain coconut shell particles; washing the coconut shell particles with water, and conducting dehydration and drying to obtain the coconut shell fiber.

Further, the coconut shell fiber has a water content of less than or equal to 14%.

Further, in the preparation method of the coconut shell fiber, the separated kernel can be directly eaten or processed as a food raw material, such as preparing coconut oil and the like.

In the present disclosure, cellulose and lignin in the coconut shell are ripened through ripening of the coconut shell, and can increase the toughness, reduce the density, and reduce the weight of the cat litter. In addition, the ripened cellulose and lignin do not continue to decompose during use. In this way, when being used as nutrient soil or compost, these matters have no damage to delicate young roots, and ensure that the root system of cultivated plants can grow normally.

Further, the coffee grounds have a particle size of 80 mesh to 100 mesh and a water content of less than or equal to 14%.

Further, the starch is one or more selected from the group consisting of corn starch, tapioca starch, red potato starch, potato starch, sweet potato starch, mung bean starch, and wheat starch.

Preferably, the starch is one or two selected from the group consisting of the corn starch and the tapioca starch.

Further, the binder is one or more selected from the group consisting of guar gum, carboxymethyl cellulose, sodium alginate, sodium polyacrylate, pregelatinized corn starch, and xanthan gum.

Preferably, the binder is one or more selected from the group consisting of the guar gum and the sodium polyacrylate.

The present disclosure further provides a preparation method of the plant-based cat litter, including the following steps:
(1) preparing: mixing the coconut shell fiber, the coffee grounds, the starch, the binder, and water evenly by stirring to obtain a mixture;
(2) molding: conducting granulation on the mixture to obtain granules;
(3) drying: conducting dust removal and drying on the granules; and
(4) cooling and sieving: cooling obtained dried granules to room temperature, conducting secondary dust removal, and then sieving to obtain the plant-based cat litter.

Further, in step (1), the mixing is conducted for 2 min to 3 min, and the mixture has a water content of 18% to 23%.

Further, in step (2), the granules have a particle size of 2 mm to 3 mm.

Further, in step (3), the drying is conducted at 80° C. to 85° C., and the dried granules have a water content of less than or equal to 10%.

Further, the plant-based cat litter has a particle size of less than or equal to 5 mm and a length of 5 mm to 20 mm.

Compared with the prior art, the present disclosure has the following beneficial technical effects.
(1) In the present disclosure, the product adopts vegetable raw materials such as coconut shell fiber and coffee grounds, and these raw materials are natural without any additives and chemicals. The plant-based cat litter is safe, non-toxic, easy to clean, less dusty, and non-polluting.
(2) In the present disclosure, the coffee grounds endow the plant-based cat litter with a fragrant coffee flavor, such that the plant-based cat litter has desirable adsorption and deodorizing effects.
(3) In the present disclosure, the plant-based cat litter has excellent water absorption, bulkiness, and deodorization and adsorption properties. The plant-based cat litter is biodegradable and environmental-friendly, and can effectively improve the living environment of cats.
(4) In the present disclosure, the plant-based cat litter can be used as nutrient soil or organic fertilizers after use, so as to improve the soil and save resources.
(5) In the present disclosure, the plant-based cat litter cannot be infected with insects and mildew after being placed for a long time, and is convenient to use. The plant-based cat litter is naturally dispersed after being soaked in water, and then can be flushed into the toilet or discarded, thus not leading to environmental pollutions.
(6) In the present disclosure, the plant-based cat litter is a light product with high strength, and is not easy to break and fracture during storage and transportation. The plant-based cat litter has a comfortable foot feel and is liked by cats. Moreover, the plant-based cat litter clumps immediately after contacting with urine or feces, has desirable wrapping properties on the feces, and can be easily scooped out without getting stuck in the toes of cats.

DETAILED DESCRIPTION OF THE EMBODIMENTS

The technical solutions provided by the present disclosure will be further described below with reference to the accompanying examples.

In the examples of the present disclosure, a preparation method of the coconut shell fiber includes: separating a coconut shell from a kernel of a mature coconut; allowing the coconut shell to stand for 25 d to 35 d to conduct ripening; subjecting an obtained ripened coconut shell to pulverization and then sieving through a 30-mesh sieve to obtain coconut shell particles; washing the coconut shell particles with water, and conducting dehydration and drying to obtain the coconut shell fiber with a water content of less than or equal to 14%.

Example 1

A preparation method of a plant-based cat litter included the following steps:
(1) preparing: in parts by weight, 44 parts of a coconut shell fiber, 15 parts of coffee grounds, 36 parts of corn starch, 5 parts of guar gum, and 13 parts of water were mixed by stirring in a premixer for 2 min to obtain a mixture with a water content controlled at 20%;
(2) molding: the mixture obtained in step (1) was added to a storage bin through a screw feeder, and then granulated and molded by a 2 mm vertical ring-die granulator;
(3) screening: a product obtained in step (2) was conveyed into a vibrating screen through a belt conveyor to conduct first dust removal;
(4) drying: a product obtained in step (3) was conveyed into a microwave dryer through a belt conveyor, and dried at 82° C. such that a water content after the drying was 10%; and
(5) cooling and sieving: a product obtained in step (4) was conveyed into a cooling tower through a belt conveyor, cooled to room temperature, and then subjected to sieving and secondary dust removal; particles or dust less than 5 mm were retained by the sieve, and particles with a length of 8 mm were passed through the vibrating screen to obtain the plant-based cat litter.

Example 2

A preparation method of a plant-based cat litter included the following steps:
(1) preparing: in parts by weight, 44 parts of a coconut shell fiber, 15 parts of coffee grounds, 38 parts of tapioca starch, 3 parts of guar gum, and 12 parts of water were mixed by stirring in a premixer for 2 min to obtain a mixture with a water content controlled at 19%;
(2) molding: the mixture obtained in step (1) was added to a storage bin through a screw feeder, and then granulated and molded by a 2 mm vertical ring-die granulator;
(3) screening: a product obtained in step (2) was conveyed into a vibrating screen through a belt conveyor to conduct first dust removal;
(4) drying: a product obtained in step (3) was conveyed into a microwave dryer through a belt conveyor, and dried at 82° C. such that a water content after the drying was 10%; and
(5) cooling and sieving: a product obtained in step (4) was conveyed into a cooling tower through a belt conveyor, cooled to room temperature, and then subjected to sieving and secondary dust removal; particles or dust less than 5 mm were retained by the sieve, and particles with a length of 8 mm were passed through the vibrating screen to obtain the plant-based cat litter.

Example 3

A preparation method of a plant-based cat litter included the following steps:

A preparation method included the following steps:

(1) preparing: in parts by weight, 48 parts of a coconut shell fiber, 10 parts of coffee grounds, 36 parts of corn starch, 1 part of sodium polyacrylate, 5 parts of guar gum, and 14 parts of water were mixed by stirring in a premixer for 3 min to obtain a mixture with a water content controlled at 21%;

(2) molding: the mixture obtained in step (1) was added to a storage bin through a screw feeder, and then granulated and molded by a 2 mm vertical ring-die granulator;

(3) screening: a product obtained in step (2) was conveyed into a vibrating screen through a belt conveyor to conduct first dust removal;

(4) drying: a product obtained in step (3) was conveyed into a microwave dryer through a belt conveyor, and dried at 82° C. such that a water content after the drying was 10%; and (5) cooling and sieving: a product obtained in step (4) was conveyed into a cooling tower through a belt conveyor, cooled to room temperature, and then subjected to sieving and secondary dust removal; particles or dust less than 5 mm were retained by the sieve, and particles with a length of 10 mm were passed through the vibrating screen to obtain the plant-based cat litter.

Example 4

A preparation method of a plant-based cat litter included the following steps:

(1) preparing: in parts by weight, 40 parts of a coconut shell fiber, 16 parts of coffee grounds, 25 parts of corn starch, 15 parts of tapioca starch, 0.5 parts of sodium polyacrylate, 3.5 parts of guar gum, and 10 parts of water were mixed by stirring in a premixer for 3 min to obtain a mixture with a water content controlled at 18%;

(2) molding: the mixture obtained in step (1) was added to a storage bin through a screw feeder, and then granulated and molded by a 2 mm vertical ring-die granulator;

(3) screening: a product obtained in step (2) was conveyed into a vibrating screen through a belt conveyor to conduct first dust removal;

(4) drying: a product obtained in step (3) was conveyed into a microwave dryer through a belt conveyor, and dried at 80° C. such that a water content after the drying was 10%; and (5) cooling and sieving: a product obtained in step (4) was conveyed into a cooling tower through a belt conveyor, cooled to room temperature, and then subjected to sieving and secondary dust removal; particles or dust less than 5 mm were retained by the sieve, and particles with a length of 10 mm were passed through the vibrating screen to obtain the plant-based cat litter.

Example 5

A preparation method of a plant-based cat litter included the following steps:

(1) preparing: in parts by weight, 48 parts of a coconut shell fiber, 16 parts of coffee grounds, 30 parts of corn starch, 1 part of sodium polyacrylate, 5 parts of guar gum, and 13 parts of water were mixed by stirring in a premixer for 3 min to obtain a mixture with a water content controlled at 20%;

(2) molding: the mixture obtained in step (1) was added to a storage bin through a screw feeder, and then granulated and molded by a 2 mm vertical ring-die granulator;

(3) screening: a product obtained in step (2) was conveyed into a vibrating screen through a belt conveyor to conduct first dust removal;

(4) drying: a product obtained in step (3) was conveyed into a microwave dryer through a belt conveyor, and dried at 82° C. such that a water content after the drying was 10%; and (5) cooling and sieving: a product obtained in step (4) was conveyed into a cooling tower through a belt conveyor, cooled to room temperature, and then subjected to sieving and secondary dust removal; particles or dust less than 5 mm were retained by the sieve, and particles with a length of 8 mm were passed through the vibrating screen to obtain the plant-based cat litter.

Example 6

A preparation method of a plant-based cat litter included the following steps:

(1) preparing: in parts by weight, 48 parts of a coconut shell fiber, 13 parts of coffee grounds, 38 parts of tapioca starch, 1 part of sodium polyacrylate, and 15 parts of water were mixed by stirring in a premixer for 3 min to obtain a mixture with a water content controlled at 23%;

(2) molding: the mixture obtained in step (1) was added to a storage bin through a screw feeder, and then granulated and molded by a 2 mm vertical ring-die granulator;

(3) screening: a product obtained in step (2) was conveyed into a vibrating screen through a belt conveyor to conduct first dust removal;

(4) drying: a product obtained in step (3) was conveyed into a microwave dryer through a belt conveyor, and dried at 85° C. such that a water content after the drying was 10%; and (5) cooling and sieving: a product obtained in step (4) was conveyed into a cooling tower through a belt conveyor, cooled to room temperature, and then subjected to sieving and secondary dust removal; particles or dust less than 5 mm were retained by the sieve, and particles with a length of 8 mm were passed through the vibrating screen to obtain the plant-based cat litter.

Test Example 1

30 cat owners were recruited to use the plant-based litter of Example 1. In a clean cat litter box, a layer of the plant-based litter was spread with a thickness of 5 cm to 6 cm, and used cat litter was cleaned up every day. The clumping properties, collapsibility, deodorization effect, insect infestation, mildew, and dust of the cat litter were observed and tested. The cat litter was added regularly once a week, continuously for 1 month, and the results were evaluated.

Test results: 29 owners reported that the plant-based cat litter had excellent clumping, less dust, no insects, no mold, and no odor, and cats were will to use the cat litter without rejection. The plant-based cat litter was particularly good at wrapping the feces, and could be easily scooped out without getting stuck in the cat's toes. After use, the plant-based cat litter could be flushed directly into the toilet without clogging, and was convenient for disposal. 1 owner did not report back on the test situation. 5 of the owners planted cat mint by shoveling out the plant-based cat litter, and the cat mint began to germinate within about 3 d to 5 d, with lush growth, and could be cut and used to feed cats within about 7 d.

Comparative Example 1

Bioline bentonite-based cat litter commercially available was used.

Comparative Example 2

Bioline tofu cat litter commercially available was used.

Comparative Example 3

Cat's Best sawdust cat litter commercially available was used.

Test Example 2

The smell, water absorption, clumping properties, dust rate, deodorizing effect, and collapsibility of each cat litter in Examples 1 to 6 and Comparative Examples 1 to 3 were tested.

Test Methods were as Follows:

1. Smell: an appropriate amount of samples were placed on a white enamel plate, and identification was conducted with nose under natural light or 40 W fluorescent lamp.

2. Water absorption: the cat litter was sampled with a sampler and then spread in a sample basin, such that the sample had a thickness of about 8 cm to 10 cm. 20 mL of a 1% sodium chloride solution at 36° C. to 40° C. was drawn with a syringe, and the syringe was pushed evenly at a height of about 3 cm from a sample plane, such that the solution flowed into the sample within 30 s. 60 s after the sample was completely flowed, the plumped sample was collected, and a mass m was weighed on a balance with a sensitivity specification of 0.01 g. According to this method, 3 groups of samples are made to obtain an average, and a calculation formula of the water absorption was as follows:

$$X = \frac{20}{m-20} \times 100\%$$

In the formula: X represented water absorption (%); m represented clumping gram weight, in gram (g).

3. Clumping properties: the cat litter was sampled with a sampler and then spread in a sample basin, such that the sample had a thickness of about 8 cm to 10 cm. 20 mL of a 1% sodium chloride solution at 36° C. to 40° C. was drawn with a syringe, and the syringe was pushed evenly at a height of about 3 cm from a sample plane, such that the solution flowed into the sample within 30 s. 60 s after the sample was completely flowed, the plumped sample was collected, and a longitudinal length of the sample was measured with a ruler, which was the clumping properties of cat litter. According to this method, 3 groups of samples are made to obtain an average.

4. Dust rate: 2.5 kg (M2) of finished cat litter was randomly selected, and then poured into a 30-mesh standard sieve in 5 batches at 500 g in each batch. Each batch of the poured cat litter was placed in a vibrating screen, covered by a sealing cover, and the vibrating screen was started to vibrate for 15 s. 5 batches of powder under the sieve were collected after the vibrating screen stopped, and a total weight was measured as W.

A formula for calculating the dust rate was as follows:

$$F = \frac{W}{M2} \times 100\%$$

In the formula: F represented the dust rate (%); M2 represented a total weight of the sample, in grams (g); W represented a total weight of the sieved powder, in grams (g).

5. Deodorizing effect: an ammonia solution with a concentration of 5 wt % was configured as an odor source. At a constant temperature of 23° C. to 27° C., the samples with bulk density were placed together with a material cup in a square sealable sample box with a length of 30 cm, a width of 20 cm, and a height of 10 cm, or in a sample box of the same volume. An ammonia analyzer was placed 10 cm away from the material cup, 20 mL of the configured odor source was pipetted with a pipette and flowed down to a center of the material cup, and the sample box was sealed. After timing for 3 min, a read value was the deodorizing effect.

6. Collapsibility: a lumpy sample after testing the water absorption and the clumping properties were randomly selected, placed into a beaker filled with 300 mL of distilled water at a room temperature, timing was started, while the sample was gently stirred clockwise at a speed of one circle/2 s using a sample spoon. Whether the lumpy sample collapsed into multiple fragments with a diameter of less than 2 cm were observed, and the time for complete collapse was recorded.

The test results were as follows:

| Sample | Smell | Water absorption (%) | Clumping properties (cm) | Dust rate (%) | Deodorizing effect (ppm) | Collapsibility (s) |
|---|---|---|---|---|---|---|
| Example 1 | Fragrance of coffee | 110 | 4.3 | 0.21 | 12 | 16 |
| Example 2 | Fragrance of coffee | 110 | 4.3 | 0.23 | 12 | 17 |
| Example 3 | Fragrance of coffee | 105 | 4.5 | 0.2 | 18 | 20 |
| Example 4 | Fragrance of coffee | 108 | 4.5 | 0.2 | 10 | 18 |

-continued

| Sample | Smell | Water absorption (%) | Clumping properties (cm) | Dust rate (%) | Deodorizing effect (ppm) | Collapsibility (s) |
|---|---|---|---|---|---|---|
| Example 5 | Fragrance of coffee | 115 | 3.8 | 0.25 | 10 | 15 |
| Example 6 | Fragrance of coffee | 112 | 4.2 | 0.25 | 15 | 16 |
| Comparative Example 1 | None | 42 | 8 | 1 | 85 | Non-dispersed |
| Comparative Example 2 | Fragrance of milk | 92 | 5 | 0.5 | 40 | 28 |
| Comparative Example 3 | Smell of sawdust | 76 | 8 | 0.8 | 35 | 35 |

It was seen that the cat litter prepared by Examples 1 to 6 of the present disclosure showed excellent water absorption, clumping properties, deodorizing effect, collapsibility, and low dust rate, which were significantly better than those of Comparative Examples 1 to 3.

Test Example 3 Toxicological Test

1) Materials and Animals

Test samples: the plant-based cat litter of Examples 1 to 6.

Experimental animals: a total of 120 SPF-grade KM mice, weighing 18 g to 22 g, half male and half female, provided by SPF (Beijing) biotechnology Co., LTD., with a production license number: SCXK (Beijing) 2019-0010.

2) Experimental Method

The experiment was conducted with reference to an acute oral toxicity test method in the "Safety and Technical Standards for Cosmetics (2015 Edition)".

3) Experimental Results

The oral median lethal dose ($LD_{50}$) of the test sample to KM female and male mice was greater than 5,000 mg/BW, and the results were as follows:

| Group | Dose (mg/kg BW) | Gender | Number of animals (mice) | Number of dead animals (mice) |
|---|---|---|---|---|
| Example 1 | 5000 | Female | 10 | 0 |
| | 5000 | Male | 10 | 0 |
| Example 2 | 5000 | Female | 10 | 0 |
| | 5000 | Male | 10 | 0 |
| Example 3 | 5000 | Female | 10 | 0 |
| | 5000 | Male | 10 | 0 |
| Example 4 | 5000 | Female | 10 | 0 |
| | 5000 | Male | 10 | 0 |
| Example 5 | 5000 | Female | 10 | 0 |
| | 5000 | Male | 10 | 0 |
| Example 6 | 5000 | Female | 10 | 0 |
| | 5000 | Male | 10 | 0 |

It was seen that the plant-based cat litter of Examples 1 to 6 had an oral $LD_{50}$ of greater than 5,000 mg/BW for both male and female KM mice, and belonged to a practical non-toxic substance.

Specific examples are used herein to explain the principles and implementations of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A preparation method of a plant-based cat litter comprising the following raw materials in parts by weight: 35 parts to 50 parts of a coconut shell fiber, 5 parts to 20 parts of coffee grounds, 25 parts to 45 parts of starch, 1 part to 10 parts of a binder, and 8 parts to 16 parts of water, comprising the following steps:
   (1) preparing: mixing the coconut shell fiber, the coffee grounds, the starch, the binder, and the water evenly by stirring to obtain a mixture;
   (2) molding: conducting granulation on the mixture to obtain granules;
   (3) drying: conducting dust removal and drying on the granules; and
   (4) cooling and sieving: cooling obtained dried granules to room temperature, conducting secondary dust removal, and sieving to obtain the plant-based cat litter.

2. The preparation method of the plant-based cat litter according to claim 1, wherein in step (1), the mixing is conducted for 2 min to 3 min, and the mixture has a water content of 18% to 23%.

3. The preparation method of the plant-based cat litter according to claim 1, wherein in step (2) the granules each have a particle size of 2 mm to 3 mm.

4. The preparation method of the plant-based cat litter according to claim 1, wherein in step (3), the drying is conducted at 80° C. to 85° C., and the dried granules each have a water content of less than or equal to 10%.

5. The preparation method of the plant-based cat litter according to claim 1, wherein the plant-based cat litter has a particle size of less than or equal to 5 mm and a length of 5 mm to 20 mm.

6. The preparation method of the plant-based cat litter according to claim 1, wherein a preparation method of the coconut shell fiber comprises: separating a coconut shell from a kernel of a mature coconut; allowing the coconut shell to stand for 25 d to 35 d to conduct ripening; subjecting an obtained ripened coconut shell to pulverization and then sieving through a 30 mesh sieve to obtain coconut shell particles; washing the coconut shell particles with water, and conducting dehydration and drying to obtain the coconut shell fiber.

7. The preparation method of the plant-based cat litter according to claim 1, wherein the starch is one or more selected from the group consisting of corn starch, tapioca starch, red potato starch, potato starch, sweet potato starch, mung bean starch, and wheat starch.

8. The preparation method of the plant-based cat litter according to claim 1, wherein the binder is one or more selected from the group consisting of guar gum, carboxymethyl cellulose, sodium alginate, sodium polyacrylate, pregelatinized corn starch, and xanthan gum.

9. The preparation method of the plant-based cat litter according to claim 6, wherein in step (1), the mixing is conducted for 2 min to 3 min, and the mixture has a water content of 18% to 23%.

10. The preparation method of the plant-based cat litter according to claim 7, wherein in step (1), the mixing is conducted for 2 min to 3 min, and the mixture has a water content of 18% to 23%.

11. The preparation method of the plant-based cat litter according to claim 8, wherein in step (1), the mixing is conducted for 2 min to 3 min, and the mixture has a water content of 18% to 23%.

12. The preparation method of the plant-based cat litter according to claim 6, wherein in step (2), the granules each have a particle size of 2 mm to 3 mm.

13. The preparation method of the plant-based cat litter according to claim 7, wherein in step (2), the granules each have a particle size of 2 mm to 3 mm.

14. The preparation method of the plant-based cat litter according to claim 8, wherein in step (2), the granules each have a particle size of 2 mm to 3 mm.

15. The preparation method of the plant-based cat litter according to claim 6, wherein in step (3), the drying is conducted at 80° C. to 85° C., and the dried granules each have a water content of less than or equal to 10%.

16. The preparation method of the plant-based cat litter according to claim 7, wherein in step (3), the drying is conducted at 80° C. to 85° C., and the dried granules each have a water content of less than or equal to 10%.

\* \* \* \* \*